United States Patent [19]

Rudolf

[11] 4,121,395

[45] Oct. 24, 1978

[54] FIBRE REINFORCED PLASTICS PART FOR USE UNDER TRACTION

[76] Inventor: Artur Rudolf, Biebelshofer Weg 2, Hermesdorf-Waldbroel, Germany, 5221

[21] Appl. No.: 772,361

[22] Filed: Feb. 25, 1977

[30] Foreign Application Priority Data

Mar. 16, 1976 [DE] Fed. Rep. of Germany ....... 2610915

[51] Int. Cl.² .............................................. E04C 3/10
[52] U.S. Cl. ....................................... 52/230; 24/122.6
[58] Field of Search ................. 52/230, 223 R, 223 L; 24/122.6

[56] References Cited

U.S. PATENT DOCUMENTS

| | | |
|---|---|---|
| 2,737,802 | 3/1956 | Bakker .................................. 52/230 |
| 2,751,660 | 6/1956 | Nakonz ............................. 52/230 X |
| 3,099,109 | 7/1963 | Hahn .................................. 52/223 L |
| 3,249,374 | 5/1966 | Muehe et al. ................... 52/223 R X |
| 3,672,712 | 6/1972 | Davis ............................. 24/122.6 X |
| 3,739,457 | 6/1973 | Davis ............................. 24/122.6 X |

Primary Examiner—Price C. Faw, Jr.
Assistant Examiner—Carl D. Friedman
Attorney, Agent, or Firm—Burgess, Dinklage & Sprung

[57] ABSTRACT

In order to be able to utilize more fully the high tensile strength in the direction of fibres of unidirectionally glass fibre reinforced plastics, the anchoring element according to the invention is made up of layers at least in the zone where the forces of traction are introduced, with metal force transmitting elements glued in between the layers. A particularly suitable form of force transmitting elements are wedges with shoulders.

8 Claims, 5 Drawing Figures

FIBRE REINFORCED PLASTICS PART FOR USE UNDER TRACTION

This invention relates to a fibre reinforced plastics part for use under traction.

Parts made of fibre reinforced plastics which have a high tensile strength comparable to that of steel in the direction of their reinforcing fibres, particularly if unidirectionally reinforced, are already known. This characteristic together with other advantageous properties such as considerable elongation, high resistance to corrosion and low cost makes such unidirectionally fibre reinforced plastics parts, for example in the form of bands or rods, particularly suitable for taking up high forces and they can be used, for example, to replace prestressed iron bars in steel concrete constructions or bridge building. However, no suitable elements for conducting tractional forces into these parts are known which would enable the high tensile strength of the composite material to be efficiently utilised.

Welding or soldering processes are not suitable. Bolts inserted in bores in the plastics part perpendicularly to the direction of the fibres could at the most take up forces which do not exceed the shear strength of admissible bearing pressures against the sides of the bores and owing to the highly anisotropic nature of the strength of these materials it would enable only a fraction of the potential strength to be utilised. If the plastics part were glued to a tie rod, the maximum force which could be transmitted would be limited by the shear strength of the bond, which is considerably lower than the tensile strength of the fibre reinforced plastics part in the direction of its fibres. Moreover, the forces introduced on the surface would have to be transmitted inwards over the whole cross-section by shearing forces in the matrix.

A method of introducing forces through closed loops has been described by Hutter in "Kunststoffe" 50 (1960) 6,321. The loops are made of endless strands which extend from the structural element and return to it. This process is very expensive.

In "Die Bautechnik" 4 (1974) 115/120, Rehm and Hubner have stated that the use of glass fibre rods bonded with synthetic resin which are inserted in prestressed structural elements and subsequently bonded would appear to be useful only where suitable butt anchoring systems are available which are adapted to the specific properties of the glass fibre rods.

It is an object of the present invention to provide fibre reinforced plastics parts for use under traction which enable the high tensile strength of the plastics in the direction of the fibres to be more fully utilised. The solution should provide a high safety margin, that is to say the stress on the material should be kept by a predetermined amount below the breaking load. Other aspects to be considered would be the practicability and flexibility. The element provided for introducing the forces of traction should be so designed that it can be applied at the building site if the prestressed parts are large or are to be altered subsequently.

According to the invention, there is provided a fibre reinforced plastics part for use under traction, comprising a plurality of layers at least in the zone where the forces of traction are designed to be introduced, between which layers metal force transmitting elements are bonded. One particular advantage of the part according to the invention is the degree of safety with which tensile stresses of a level which could not hitherto be fully utilised can be transmitted from the fibre reinforced plastics part into an anchoring means. Owing to the increased surface area to which adhesive has been applied, the shear stress between the layers of fibre reinforced plastics and the wedges with force transmitting elements inserted between these layers is kept below the shear strength and no breakage therefore occurs in the zone of the joints.

It is not always possible to produce the necessary layers by subsequently splitting compact fibre reinforced plastics parts in the zones where the force is to be introduced, but separating surfaces can be inserted in the necessary positions during manufacture, and wedges of metal elements can subsequently be pushed in between these surfaces and bonded to them.

In many cases, however, it is both possible and advantageous to build up the entire fibre reinforced plastics part from layers from the start. When the fibre reinforced plastics part is to be used as a prestressed element, it is immaterial from the point of view of the tensile strength ultimately obtained whether the plastics part is obtained from a solid prism or cylinder or made up of individual unidirectionally fibre reinforced bands all having the same tensile strength, provided only that the finished product has the required total cross-sectional area and volumetric proportion of glass fibres. A high strength continuous band having a thickness of between 0.5 and 4 mm which is unidirectionally reinforced with glass fibres is already known. This material can be used for the manufacture of prestressed elements and is ideally suited for obtaining the layered structure required for a prestressed element according to the invention.

Special advantages are obtained if the whole plastics part is composed of unidirectionally fibre reinforced bands or plates, particularly in the case of large parts. Prestressed elements 50 m in length or more, for example, are used for harbour construction and bridge building. A prestressed element of this kind which has been prefabricated in the factory is difficult to transport to the building site on account of its rigidity but the bands can easily be rolled up and transported. Another factor of considerable importance is that these fibre reinforced bands can be rationally manufactured and the cross-section of the prestressed elements can easily be adjusted to the individual requirements. If the fibre reinfoced plastics part is required to be compact, this can be achieved by, for example, subsequently glueing the bands together.

The metal force transmitting elements are preferably in the form of wedges with lateral extensions or shoulders so that forces can be transmitted to a support by means of known devices.

In one particular embodiment of the invention, in the zone where forces of traction are designed to be introduced, the part is clamped together by the pressure of clamping jaws. The lateral pressure can be raised to a level above the shear strength. The margin between the actual load applied and the load limit at which damage would occur is thereby increased so that this arrangement provides an additional safety reserve. This lateral pressure must, of course, be less than the crushing strength perpendicularly to the direction of the fibres. The shear strength in a bond may be, for example, 10 N/mm$^2$. The fibre reinforced plastics part would be damaged by the application of a pressure per unit area of 75 N/mm$^2$, but a lateral pressure of 25 N/mm$^2$ considerably increases the safety reserve of the force transmitting element.

It is possible to distribute the pressure per unit area over the fibre reinforced plastics part so that the unit pressure is lower in the marginal zone of the prestressed element than at the centre of the clamping jaws. Tension peaks are thereby reduced.

The clamping jaws according to the invention are also very useful if, for example, in the case of exceptionally large plastics parts the elements for introducing the forces for traction are manufactured on the building site. Since lateral pressure must in any case be applied for bonding, and this is preferably done by increasing the pressure per unit area stepwise, no additional effort is required. Moreover, this method ensures that the clamping jaws do not subject the part to a peeling stress.

An embodiment of the invention is described below with reference to the drawings in which.

Figure 1:
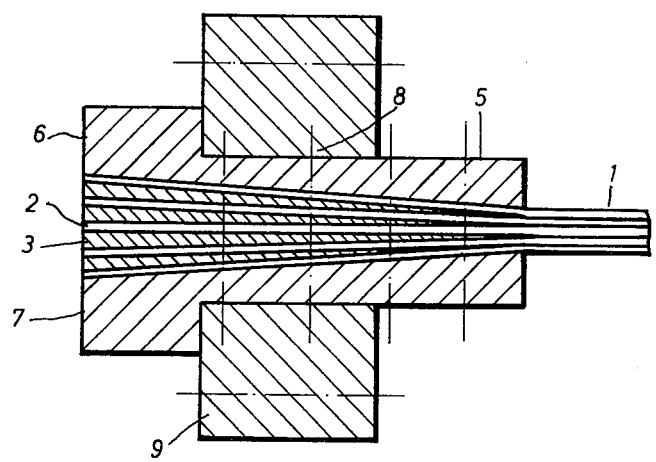
FIG. 1 is a section through a prestressed element from the side.
Figure 2:
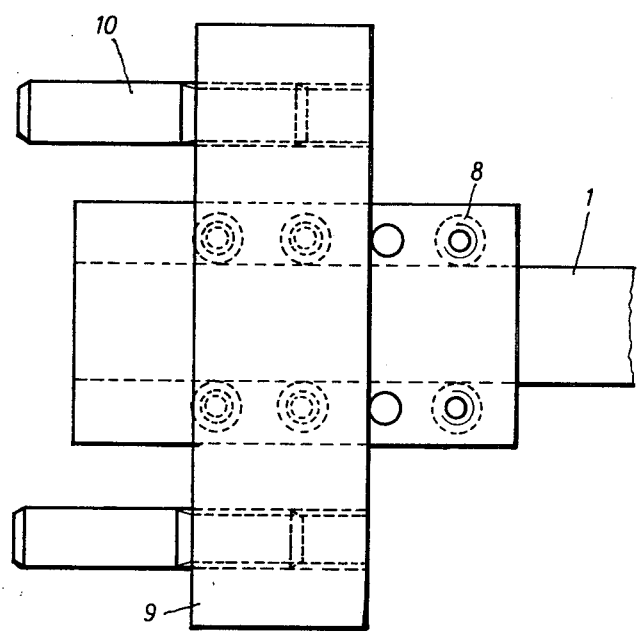
FIG. 2 is a top plan view of a prestressed element.
Figure 3:
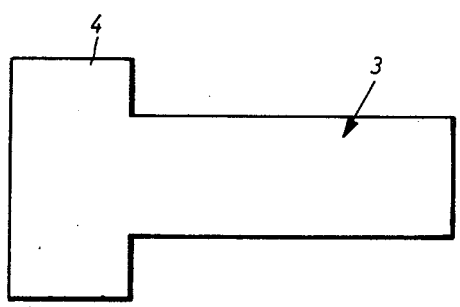
FIG. 3 shows a force transmitting element.
Figure 4:
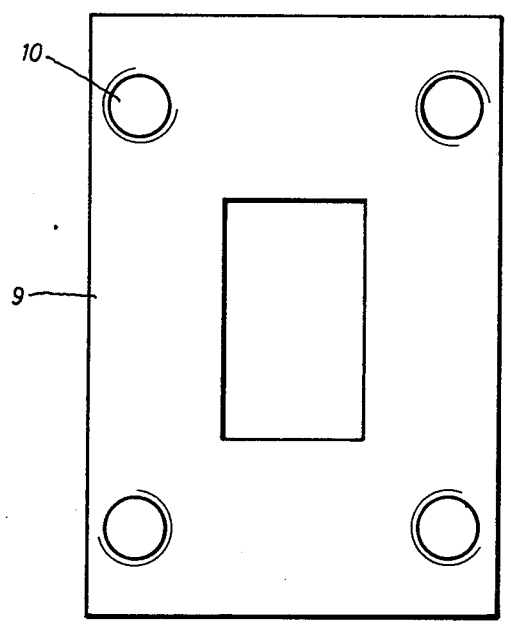

FIG. 4 an anchoring plate and

Figure 5:
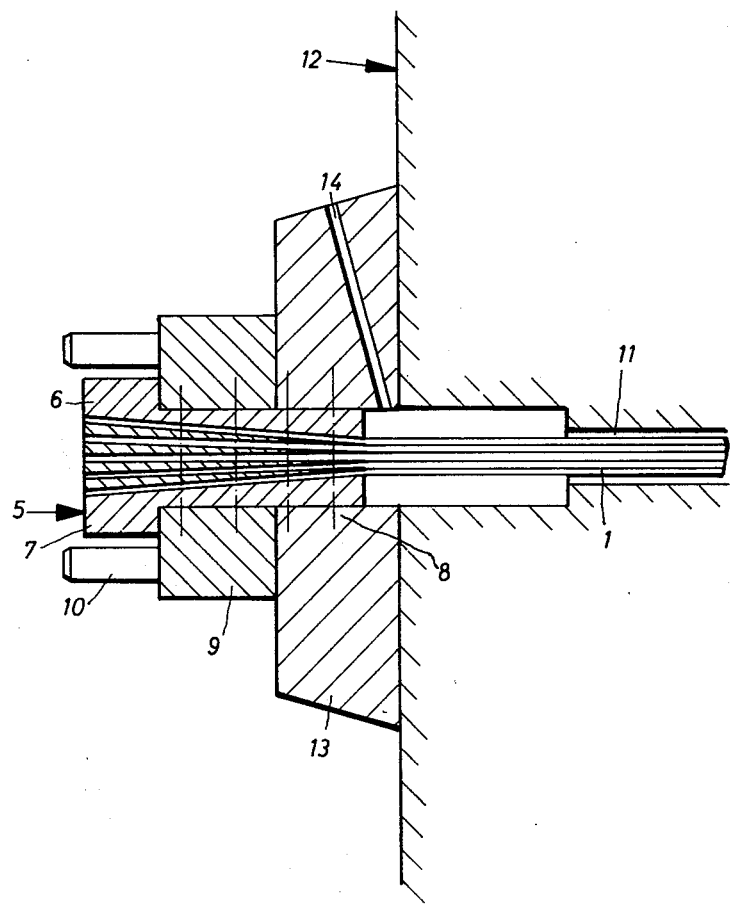

FIG. 5 a section through a clamping head with anchoring means.

The glass fibre reinforced plastics part 1 is in the form of a prism and is composed of unidirectionally fibre reinforced bands 2. Metal wedges 3 with lateral shoulders 4 are glued in between the bands 2 at both ends of this part which is suitable for use as a prestressed element. The prestressed element 5 covers the plastics part 1 and consists of an upper part 6 and a lower part 7. It is pressed together by screws 8. Bolts 10 are fitted to the anchoring plate 9. FIG. 5 shows the prestressed element with anchoring means. The fibre reinforced plastics part 1 is embedded in a channel 11 for a prestressed band. Since fibre reinforced plastics parts have a higher elongation than steel, the prestressing path is considerably greater. A divided pressure element 13 is inserted between the anchoring plate 9 and building construction 12. This pressure element 13 contains an injection channel 14 through which a synthetic resin can be injected into the channel 11.

It belongs to the state of the art to make the shoulders of the force transmitting elements, the anchoring plate and the pressure element large enough to enable the high tension taken up by the fibre reinforced plastics part to be transmitted to the anchoring means.

A prestressed element according to the invention may consist, for example, of 10 bands each 19.6 mm in width and 0.78 mm in thickness. Nine wedges are glued in between the bands over a length of 20 mm on each side of the prestressed element. The width of the shoulder is 11 mm and the thickness of the wedge in this position 2 mm. Four M12 bolts are provided to fix the anchoring plate in position. A traction force of 150 kN can be conducted into this prestressed element. Breakage of the unidirectionally glass fibre reinforced bands due to traction does not occur at tensions below about 1600 N/mm$^2$.

What I claim is:

1. A fibre reinforced plastic element for use under traction, comprising a plurality of fibre reinforced layers disposed at least in a zone where the forces of traction are to be introduced and a plurality of metal force transmitting elements each disposed between two adjacent layers and directly bonded thereto with each one of the intermediate layers disposed between two adjacent metal force transmitting elements and directly bonded thereto to effect force transmission from each force transmitting element.

2. The element according to claim 1, wherein each of the force transmitting elements is wedge-shaped.

3. The element according to claim 2, wherein each force transmitting element has a shoulder at one end thereof.

4. The element according to claim 2, wherein each of the force transmitting elements is T-shaped in the plan view thereof.

5. The element according to claim 1, further comprising a pair of clamping elements disposed about the fibre reinforced layers and bonded force transmitting elements for clamping same in the zone where the forces of traction are to be introduced.

6. The element according to claim 5, further comprising a shoulder disposed at one end of each clamping element and an anchoring plate disposable about the clamping elements and between the shoulders and a construction to be anchored to.

7. The element according to claim 6, further comprising a pressure element disposable about the clamping element and between the anchoring plate and the construction.

8. The element according to claim 6, wherein the construction has a channel into which a portion of the part is embedded and wherein said pressure element has an injection bore through which synthetic resin can be injected into the channel.

* * * * *